Jan. 22, 1946.　　　　H. SCHNEIDER　　　　2,393,341
TWO-CYCLE INTERNAL-COMBUSTION ENGINE
Filed Jan. 24, 1944　　2 Sheets-Sheet 1
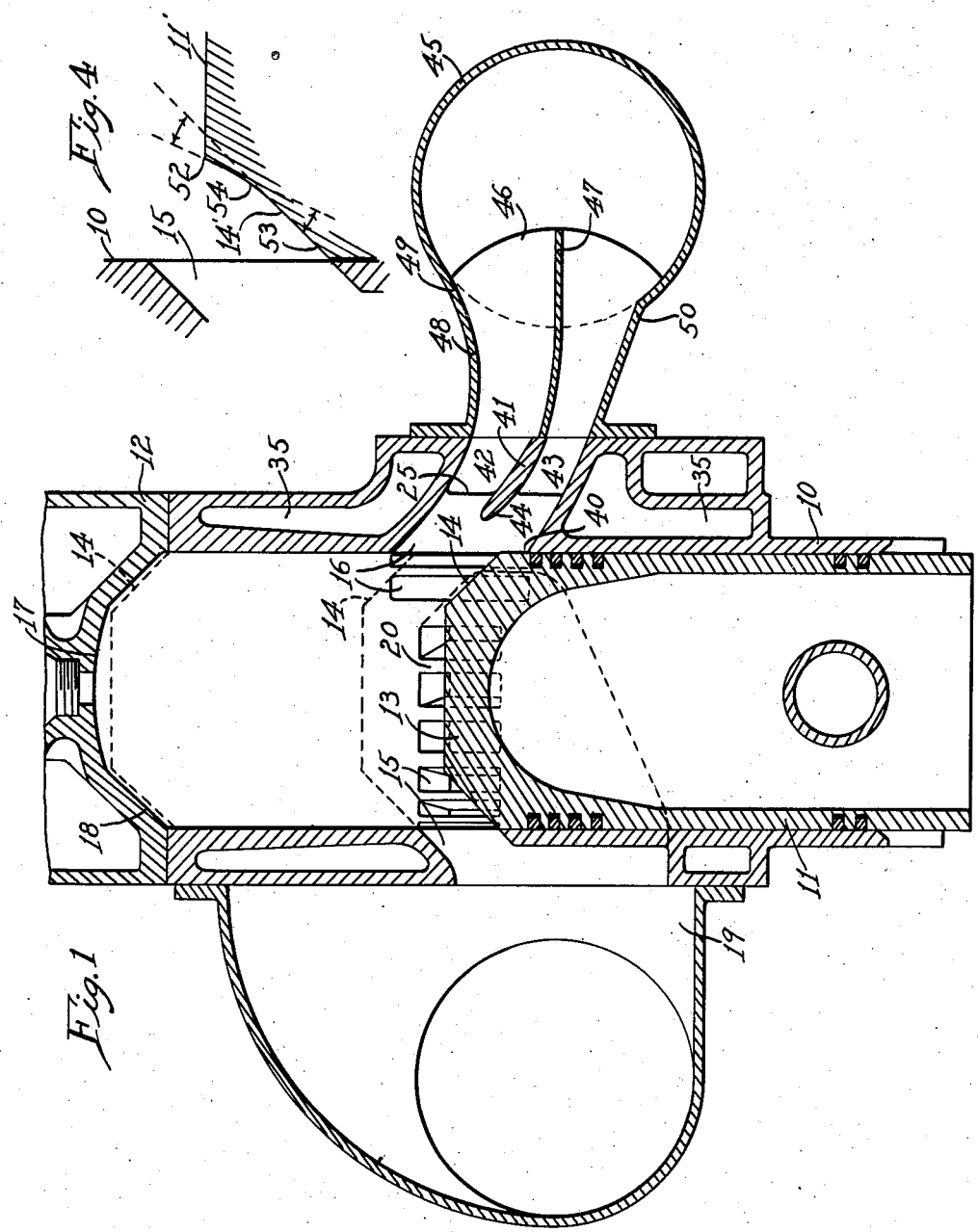
Inventor:
Heinrich Schneider
By
Andrew P. Wintercorn  Atty.

Jan. 22, 1946.    H. SCHNEIDER    2,393,341
TWO-CYCLE INTERNAL-COMBUSTION ENGINE
Filed Jan. 24, 1944    2 Sheets-Sheet 2
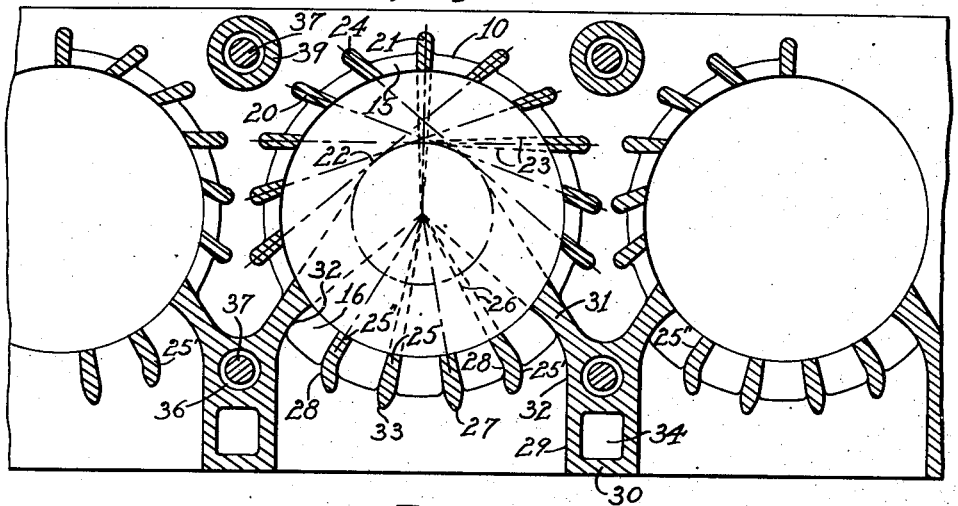
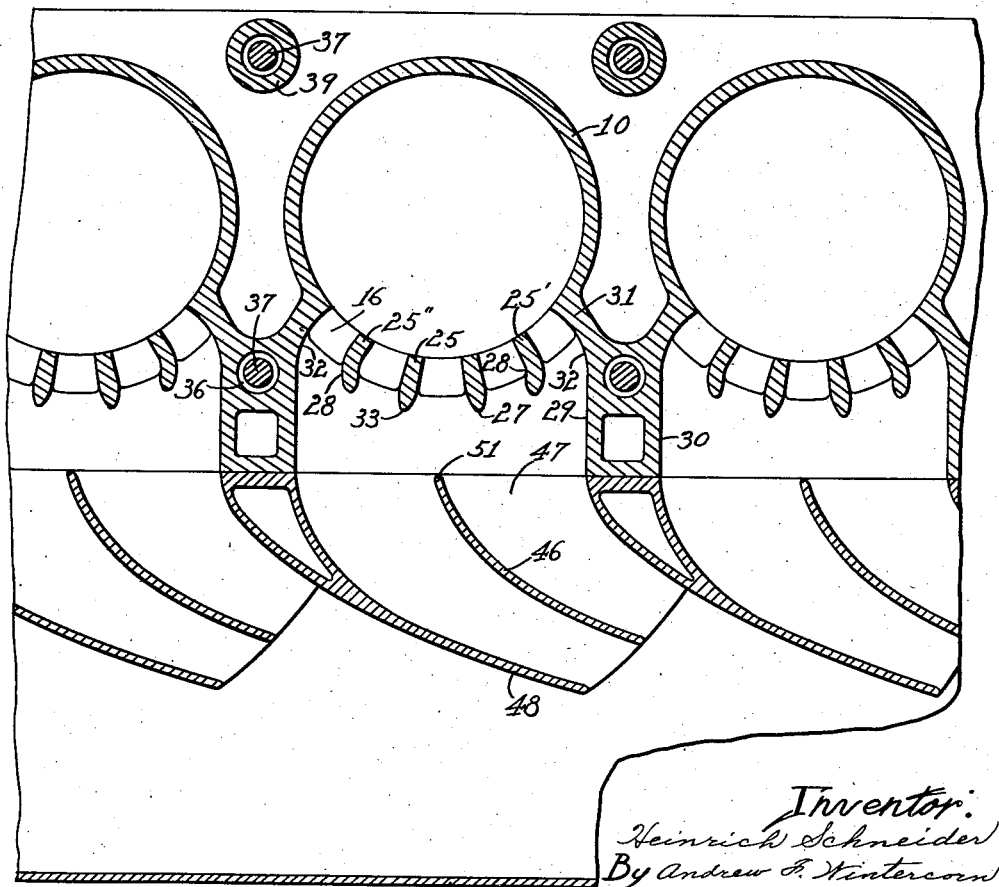

Patented Jan. 22, 1946

2,393,341

UNITED STATES PATENT OFFICE 2,393,341

TWO-CYCLE INTERNAL-COMBUSTION ENGINE

Heinrich Schneider, Hamilton, Ohio, assignor to Schneider Brothers Company, a copartnership composed of Heinrich Schneider and Viva Schneider, Hamilton, Ohio, and Adolf G. Schneider and Erna Schneider, Muncie, Ind.

Application January 24, 1944, Serial No. 519,473

22 Claims. (Cl. 123—65)

This invention relates to improvements in two cycle internal combustion engines.

The principal object of my invention is to provide an engine of the kind mentioned having a novel arrangement of scavenging air and exhaust gas passages with a view to more efficient expulsion of exhaust gases as well as more efficient charging of the cylinders. This engine can, therefore, be operated at relatively lower scavenging air pressure, requires less power for driving the blower, and is operable at higher speeds efficiently and economically.

A salient feature of the present invention consists in providing scavenging ports directed upwardly at an angle preferably between 30° and 60° in a row extending about two-thirds of the way around the circumference of the cylinder, having the ribs between the ports located on planes tangent to a circle inside the cylinder of a radius approximately equal to one-half the radius of the bore, whereby to introduce and direct the scavenging air along the walls of the cylinder opposite and in directions away from the exhaust ports, and thereby insure efficient expulsion of exhaust gases by loop flow upwardly toward the cylinder head along one side of the cylinder and downwardly along the other side and out through the exhaust ports. The ribs locating the scavenging port are tapered inwardly and have rounded outer edges with a view to obtaining substantially streamlined sections and accordingly reducing the resistance to the scavenging air flow.

Another feature of the invention is the provision of exhaust ports downwardly directed away from the cylinder head at an angle preferably between 30° and 60°. The cylinder head and the piston head each have a conically tapered ring portion at substantially the same angle as the ports, so that the upper walls of the scavenging and exhaust ports form with the tapered piston head portion, when the ports are more or less uncovered, ejector nozzles with substantially parallel or slightly diverging walls, whereby to better control the direction and flow of the scavenging air and exhaust gases for generally more efficient operation. The cylinder head has the outer ring portion thereof formed as a part of a cupola-shaped head into which the tapered piston head portion extends in its uppermost position.

Another salient feature of the present engine is the provision of exhaust ports that are elongated in the direction of piston movement and which have transverse vanes therein defining a main exhaust channel on one side nearer the cylinder head with which the tapered head of the piston cooperates near the end of the power stroke to discharge the exhaust gases at higher velocity and with minimum restriction to flow, the secondary channel defined on the other side of said vane cooperating with the tapered head of the piston when the piston reaches the end of the power stroke to discharge the remaining exhaust gases with minimum obstruction to flow, whereby to reduce the remaining pressure in the cylinder substantially to a minimum and accordingly further reduce the required scavenging air pressure and secure the advantages mentioned above. The guide vane has its inner edge disposed at a certain distance from the cylinder bore so that there will be no danger of an accumulation of carbon thereon, which would obstruct the exhaust channels and seriously affect the efficiency of operation of the engine. The exhaust ports are elongated, furthermore, to provide a pocket or shoulder at the lower end of the secondary exhaust channel and below the lowest position of the piston head where carbon can be collected without obstructing the channel and interfering with the free discharge of exhaust gases.

Another salient feature of the engine lies in the provision of guide vanes in the exhaust ports cooperating with other vanes or blades in the exhaust manifold to conduct the exhaust gases in a main stream and in a secondary stream from the cylinder bore into the manifold, the channels defined on opposite sides of these vanes for the two streams gradually widening in the direction of the flow so as to obtain an ejector nozzle effect and reduce turbulence, the exhaust flow energy being maintained and taken full advantage of for speedier discharge of the exhaust gases from the cylinder so as to enable higher speed of operation.

Another feature consists in having the extreme top portion of the ring portion of the piston head at an increased angle, the intermediate portion being curved tangentially with respect to the upper and lower portions of said ring. This formation of the piston head portion has the beneficial effect that the scavenging air leaves the piston at this edge and does not follow the piston wall over the piston top and take a short cut toward the exhaust ports.

The foregoing and other features of the invention will soon appear as reference is made in the following description to the accompanying drawings, in which—

Fig. 1 is a vertical section through a cylinder and piston of a two cycle engine made in accordance with my invention;

Fig. 2 is a horizontal section through three adjoining cylinders of the engine taken in the plane of the ports;

Fig. 3 is another horizontal section taken in the plane of the upper portion of the exhaust ports showing vertical guide vanes or blades for directing the exhaust gases into the exhaust manifold, and Fig. 4 is a fragmentary sectional view showing a portion of the ported cylinder wall, as in Fig. 1, and a corner of the piston top, in a modified or alternative construction.

Similar reference numbers are applied to corresponding parts throughout the views.

Referring first mainly to Fig. 1, the reference numeral 10 designates a cylinder of the engine and 11 a piston therein, and 12 the cylinder head. The piston has its head portion 13 made to a frusto-conical form to provide the bevel ring portion 14 at an angle preferably between thirty and sixty degrees to the bore of the cylinder, substantially corresponding to the angle of inclination of the upflow scavenging ports 15 and downflow exhaust ports 16. In that way the upper walls of the ports form with the ring portion 14 of the piston, when the ports are more or less uncovered, nozzles or ejectors with substantially parallel or slightly diverging or converging walls, as clearly appears in Fig. 1. This is for the purpose of properly directing the incoming scavenging air as well as the outgoing exhaust gases, inasmuch as the efficient operation of the engine depends to a large extent upon such proper direction of the flow, as will more clearly appear later. The cupola-shaped portion 17 of the cylinder head 12 includes a bevel ring portion 18 defining the margin thereof and having the same angularity with respect to the cylinder bore as the ring portion 14 of the piston head, so that the piston at the upper end of its travel may project into this head portion, as indicated in dotted lines in the drawings. The head portions 17 and 18 are furthermore well adapted for deflecting the scavenging air flow directed upwardly by the ports 15 along the cylinder wall, so as to reverse its direction of flow with minimum loss of velocity and direct the air downwardly along the opposite cylinder wall toward the exhaust ports. This general method of scavenging is known as the back flow method, the scavenging air being directed toward the cylinder wall opposite (or back of) the exhaust side and upwardly toward the head to cause expulsion of the exhaust gases downwardly and out through the exhaust ports. By virtue of my novel formation and arrangement of the scavenging ports 15 in relation to the novel exhaust ports 16, described in detail below, I have produced an engine operating generally with back flow scavenging and one which is much more efficient than most other engines of that type with which I am familiar, due to the fact that, generally stated, the scavenging air more thoroughly expels the exhaust gases and can be admitted under lower air pressure than has heretofore been possible. There is an appreciable reduction in the power required to drive the blower as a result of the lower air pressure requirement and, consequently, the power output of the engine is proportionately increased and the engine is operable at higher speeds.

The scavenging ports 15 communicate with a manifold 19 to which air is delivered under pressure from a blower driven by the engine. The ports 15 are directed upwardly, as shown in Fig. 1, and the ribs 20 between the ports, with the exception of a middle rib 21, are disposed in planes tangent to a circle 22 concentric with the cylinder and of a radius approximately one-half the radius of the bore of the cylinder, as clearly appears in Fig. 2. The object of this arrangement is to have the scavenging air enter the cylinder bore in directions away from the exhaust ports 16, the air from each port closer to the exhaust crowding the air from the neighboring ports toward the cylinder wall and upwardly along the cylinder wall opposite the exhaust ports toward the cupola-shaped cylinder head 12, where the air flow is directed downwardly toward the exhaust ports. Fig. 2 shows that the ports 15 for admitting the scavenging air are in a row extending about two-thirds of the way around the circumference of the cylinder, and it should be clear from this figure that the air from one port or adjacent ports is directed toward the air-stream delivered through neighboring ports, tending more or less to crowd the air against the cylinder wall opposite the exhaust ports in its upward travel. The ribs 20 are tapered inwardly, as indicated by the lines 23, which are continuations of the lines defining the opposite sides of said ribs, and the outer edges of these ribs are well rounded, as indicated at 24, whereby the ribs have a generally streamlined section and accordingly present the least obstruction to air flow past the same.

The ribs 25 between the exhaust ports 16 are in planes radially disposed with respect to the cylinder bore, as clearly appears in Fig. 2, and these ribs, as indicated by the converging lines 26 drawn to the center of the bore, are tapered inwardly toward the center of the bore. The ribs have their outer ends rounded, as indicated at 27. The two center ribs 25' and 25" are oppositely curved, as indicated at 28, to direct the exhaust gases away from the side walls 29 of the columns 30 that are cast integral with two neighboring cylinders, vertically between the cylinders. The walls or ribs 31 separating the endmost exhaust ports 16 from the endmost scavenging ports 15 are cast integral with the columns 30, thereby establishing web connections between neighboring cylinders, as clearly appears in Fig. 2. The walls or ribs 31 are of inwardly diverging cross-section so that the incoming scavenging air through the endmost ports 15 is directed away from the exhaust ports 16 and, therefore, is not apt to interfere with the discharge of exhaust gases through any of the ports 16. The inner sides 32 of the walls or ribs 31 next to the endmost exhaust ports 16 are curved on a large radius substantially concentric with the curvature of the ribs 25' and 25" defining the other sides of the endmost exhaust ports, whereby to conduct the exhaust gases around the turns and along the sides 29 of the columns 30 with minimum loss in velocity. The fact that the ribs 25 are in outwardly diverging relation with reference to one another is of advantage also in reducing likelihood of the flow of exhaust gases being impeded. The outer edges 33 of the ribs 25 are rounded, as indicated at 27. In other words, the ribs 25, like the ribs 20 between the scavenging ports 15, are of generally streamlined section with generally the same objects in view. The exhaust ports are in a row extending around substantially one-third of the cylinder circumference.

It will be noted how the columns 30 are cored vertically to provide channels 34 for circulation of cooling water therethrough between the upper and lower portions of the water jacket 35. Vertical holes 36 are also provided in the columns 30 to receive tie rods 37 extending between the crank case of the engine and the top of the cylinder block 10. Tubular columns 39 are also cast integral with the block on the opposite side of the cylinders from the columns 30, reaching from the crank case up to the top of the cylinder block 10, and other tie rods 37 extend through these columns for interconnection of the cylinder block top with the crank case. In that way the cylinders and particularly the ported sections thereof are relieved of tension stresses.

Referring now mainly to Fig. 1, it will be observed that the exhaust ports 16 are elongated appreciably in the direction of piston movement and that the upper ends of the ports are appreciably above the tops of the scavenging ports 15, so that the exhaust ports are uncovered well in advance of the scavenging ports in the power strokes of the piston. The piston is shown in dotted lines in an intermediate position so as to better illustrate to what extent the exhaust ports are uncovered before uncovering of the scavenging ports commences. This also serves to illustrate further the nozzle or ejector effect obtained by virtue of the bevel ring formation 14 on the piston head. The piston is shown in full lines in its lower dead-center position, in which the scavenging ports 15 are fully uncovered. The exhaust ports 16, however, are elongated to a level appreciably below the bevel ring portion 14 of the piston head in said position, so that pockets or shoulders are provided at 40 in the lower portions of the exhaust ports 16 at their inner end for the depositing of carbon where it will not affect the free discharge of the exhaust gases. Carbon usually appears as a result of oil being discharged from the cylinder with the exhaust gases. In a horizontal engine, I prefer to dispose the cylinders with the exhaust ports on top and the scavenging ports on the bottom, whereby to reduce to a minimum the loss of cylinder lubricating oil by exhaust blow-out.

The ports 16 have guide vanes or blades 41 dividing the same transversely so as to define an upper or primary channel 42 and a lower or secondary channel 43 on opposite sides thereof through which the exhaust gases are discharged in two streams, the bulk of the gases being exhausted through the primary channel 42 in the partial uncovering of the ports and the remaining portion of the exhaust gases being discharged through both channels 42 and 43 when the ports are fully uncovered. The inner ends of the vanes 41 are rounded, as indicated at 44, and are spaced a distance of from 5% to 20% of the cylinder diameter from the cylinder bore, so as to avoid the likelihood of carbon being deposited on the inner ends of the vanes 41 and building up resistance to the outflow of exhaust gases. The rounded shape of the inner ends of these vanes is of twofold advantage, namely, in reducing the likelihood of carbon adhering thereto, and from the standpoint of securing a generally streamlined cross-section which gives the least resistance to the outflow of exhaust gases in the separation or division of the gases into two streams. An important advantage in the provision of these vanes 41 lies in the fact that the exhaust gases are guided in their outflow and turbulence losses are accordingly greatly reduced. The primary flow through the channel 42 is at high velocity and this flow, due to its being properly guided, retains its flow energy. In that way the bulk of the gases is discharged promptly and before the secondary channel 43 is used to any appreciable extent. Both channels, of course, serve ultimately to conduct exhaust gases from the cylinder bore. The injector action previously mentioned as obtained by cooperation of the bevel ring portion 14 on the piston head with the correspondingly inclined ports 15 and 16 is extended and carried farther by the guide vanes 41, so as to insure speedier and less turbulent discharge of exhaust gases.

An exhaust manifold 45 extending the full length of the cylinder block conducts the exhaust gases from the engine to an exhaust gas turbine or may discharge these gases through a muffler or directly into the atmosphere. Guide vanes or blades 46 and 47 are provided in crosswise relation to one another inside curved ducts 48, which conduct the exhaust gases from the channels 42 and 43 into the manifold 45, and, as shown in Fig. 3, direct the streams all toward the outlet end of the manifold. The ducts 48 are in slightly overlapping relation to one another and reach only part way to the centerline of the manifold 45, so that the exhaust gases leaving any one of these ducts flows readily past the back of the next adjacent duct and out toward the outlet end of the manifold with the main stream of exhaust gases. The vanes or blades 47 are disposed to register with the vanes 41 and in effect constitute extensions or continuations thereof, as most clearly appears in Fig. 1. The ducts 48 have the top and bottom walls 49 and 50 thereof in outwardly diverging relation with respect to the cylinder but disposed with the inside of their inner ends flush with the top and bottom of the exhaust ports, whereby to carry still further the ejector action all the way from the cylinder bore to the exhaust manifold for speedier and more efficient exhausting of the exhaust gases and to give a diffusing action. The vanes 47 form with the vanes 41, in effect, a single transverse vane dividing transversely the passage from the cylinder bore to the manifold. The cross vanes 46 are disposed substantially in right angle relation to the vanes 47 but are curved lengthwise to follow the general curvature of the duct 48 and serve to further divide the two streams of exhaust gases into four streams in passing through the ducts. These vanes 46 also serve to extend the ejector action and assist in directing the exhaust gases so that they flow toward the outlet end of the exhaust manifold with least loss in velocity by reason of turbulence in the manifold. The inner ends 51 of these vanes 46 are rounded, as shown in Fig. 3, with a view to reducing to a minimum the resistance to flow of exhaust gases as the streams are divided and flow on opposite sides of the vanes 46 through the ducts 48.

The bevel ring portion 14 of the piston head may be modified, as shown at 14' in Fig. 4, in which the top portion 52 is at a steeper angle in relation to the cylinder bore than the lower portion 53, and the intermediate portion 54 is curved to connect the upper and lower portions smoothly. The lower portion 53 is substantially at the same angle relative to the bore as the ports 15 and 16. With this corner and curvature on the piston top, it should be clear that the incoming scavenging air flowing over this portion of the piston easily leaves the piston and will not be apt to follow the flat top surface of the piston 11' and take a short cut toward the exhaust ports.

In conclusion, it should be apparent from the foregoing description that I have provided a two-cycle Diesel engine having large port areas, and completely streamlined passages, and unusually long exhaust ports, about one-fourth to one-half the length of the stroke of the piston, whereby to reduce as much as possible the necessary scavenging air pressure and the power requirement for driving the blower. In other words, at a sacrifice of useful piston stroke, I have obtained the much desired benefit of high speed operation and low scavenging pressure. In view of the importance of having the port area—for the scavenging ports as well as the exhaust ports—as large as possible and in view of the fact that the limiting factors are the circumference of the cylinder and the thickness of the walls between ports, I have, as clearly shown in the drawings, provided very narrow intervening walls between ports and have provided wide ports, about two-thirds of the cylinder circumference being taken up by ports and about a third of the circumference of the cylinder being taken up by the walls between ports. The ejector action secured by the bevel ring formation on the piston top, in combination with the similarly inclined upper walls of the exhaust ports, and in further combination with horizontal and vertical guide vanes in the exhaust channels secures a reduction in the necessary scavenging pressure and blower power requirement. The ejector action is beneficial not only in avoiding turbulence, but also from the standpoint that the high velocity of the exhaust gases through the primary channels 42 provides a further ejector action to aid in the withdrawal of the last portion of the exhaust gases in the lower part of the stroke when the exhaust gas velocity has decreased, thereby proportionately reducing the air pressure necessary to scavenge and charge the cylinder. By streamlining the exhaust channels in addition to providing for the ejector action just mentioned, I obtain the advantage that more energy is made available in the exhaust manifold to be made use of in an exhaust turbine, whereas with the usual design of exhaust ports and conduits extending into the manifold, turbulence losses destroy most of the exhaust gas energy and are responsible for back pressure reaction from the manifold interfering with efficient cylinder scavenging. This engine with the thorough streamlining of the scavenging and exhaust passages and ports is especially well adapted for use with an exhaust turbine for supercharging purposes. The exhaust turbine can be similar to those used for four-cycle and aircraft engines, the blower taking in atmospheric air and discharging the compressed air into the intake of a gear-driven scavenging blower driven by the engine, the latter discharging with increased pressure into the engine cylinders, whereby supercharging is obtained by the back pressure created by the exhaust turbine. There being no restricting devices on the cylinder ports or head, such as valves for opening and closing exhaust or scavenging passages, but, instead, extremely large port areas permitting the air to get in and through the cylinder with the least flow resistance, the engine can be operated at higher speeds and with more economical supercharging.

I claim:

1. In an internal combustion engine, a cylinder having scavenging ports provided in the wall thereof in circumferentially spaced relation, the walls between ports being in planes substantially tangent to a circle of a diameter approximately half the diameter of the bore of said cylinder, all of said ports being directed toward one end of said cylinder at an angle of between 30° and 60° with respect to the bore and in a row extending about two-thirds of the way around the circumference of the cylinder, said cylinder having exhaust ports provided in the wall thereof in the remaining one-third of the way around the circumference of the cylinder, said ports all being directed away from the aforesaid end of the cylinder at an angle between 30° and 60° with respect to the bore.

2. In an internal combustion engine, a cylinder having scavenging ports provided in the wall thereof in circumferentially spaced relation, the walls between ports being in planes substantially tangent to a circle of a diameter approximately half the diameter of the bore of said cylinder, all of said ports being directed toward one end of said cylinder at an angle of between 30° and 60° with respect to the bore and in a row extending about two-thirds of the way around the circumference of the cylinder, said cylinder having exhaust ports provided in the wall thereof in the remaining one-third of the way around the circumference of the cylinder, said ports all being directed away from the aforesaid end of the cylinder at an angle between 30° and 60° with respect to the bore, and a piston for said cylinder having a conically tapered ring portion at substantially the same angle as the ports, whereby the end walls of said ports form with the ring portion on the piston nozzles with substantially parallel walls to control the direction of flow of scavenging air and exhaust gases.

3. An engine as set forth in claim 2, wherein the aforesaid end of the cylinder is cupola-shaped and has a conically tapered marginal ring portion at substantially the same angle as the tapered ring portion on said piston into which the tapered ring portion of said piston extends at one limit of its stroke.

4. In an internal combustion engine, a cylinder having scavenging ports provided in the wall thereof in circumferentially spaced relation, the walls between ports being in planes substantially tangent to a circle of a diameter approximately half the diameter of the bore of said cylinder, all of said ports being directed toward one end of said cylinder at an angle of between 30° and 60° with respect to the bore and in a row extending about two-thirds of the way around the circumference of the cylinder, said cylinder having exhaust ports provided in the wall therof in the remaining one-third of the way around the circumference of the cylinder, said ports all being directed away from the aforesaid end of the cylinder at an angle between 30° and 60° with respect to the bore, a piston for said cylinder having a conically tapered ring portion at substantially the same angle as the ports, whereby the end walls of said ports form with the ring portion on the piston nozzles with substantially parallel walls to control the direction of flow of scavenging air and exhaust gases, the exhaust ports being elongated in respect to the direction of piston movement, and guide vanes in said exhaust ports in transverse relation thereto and substantially midway between the ends thereof, dividing the exhaust ports into primary and secondary channels for conducting exhaust gases from the cylinder, said guide vanes being inclined substantially parallel to the tapered ring portion of said piston.

5. An engine as set forth in claim 4, wherein the inner ends of said guide vanes are spaced from the cylinder bore a predetermined distance, for the purpose described.

6. In an internal combustion engine, a cylinder having exhaust ports provided in the wall thereof in circumferentially spaced relation and elongated in form in the direction of piston movement, an exhaust manifold communicating with said ports, and guide vanes in said exhaust ports in transverse relation thereto and substantially midway between the ends thereof but terminating in radially spaced relation to the cylinder bore, dividing the exhaust ports into primary and secondary channels for conducting exhaust gases with minimum turbulence from the cylinder to the common manifold.

7. An engine as set forth in claim 6, wherein the inner ends of said guide vanes are spaced from the cylinder bore a distance approximately five per cent to twenty per cent of the diameter of the cylinder bore.

8. In an internal combustion engine, a cylinder having exhaust ports provided in the wall thereof in circumferentially spaced relation and elongated in form in the direction of piston movement, said ports all being directed away from the closed end of the cylinder at an angle between 30° and 60° with respect to the bore, a piston for said cylinder having a conically tapered ring portion at substantially the same angle as the ports, whereby the end walls of said ports form with the ring portion on the piston nozzles with substantially parallel walls to control the direction of flow of exhaust gases, and guide vanes in said exhaust ports in transverse relation thereto and substantially midway between the ends thereof, dividing the exhaust ports into primary and secondary channels for conducting exhaust gases from the cylinder, said guide vanes being inclined substantially parallel to the tapered ring portion of said piston.

9. In an internal combustion engine, a cylinder having scavenging ports provided in the wall thereof in circumferentially spaced relation throughout at least half of the circumference, the ports on both sides of a median plane through the center having the walls therebetween in planes substantially tangent to a circle of a diameter about half the diameter of the bore of said cylinder, there being a wall in said median plane tapered inwardly symmetrically of said median plane of the cylinder, and the other walls between scavenging ports being tapered inwardly so that the planes of the opposite sides of each wall are substantially tangent to the aforesaid circle of about half the diameter of the bore, and the outer edges of all of the last mentioned walls being rounded to reduce resistance to scavenging air flow.

10. In an internal combustion engine, a cylinder having scavenging ports provided in the wall thereof in circumferentially spaced relation throughout at least half of the circumference, the ports on both sides of a median plane through the center having the walls therebetween in planes substantially tangent to a circle of a diameter about half the diameter of the bore of said cylinder, there being a wall in said median plane tapered inwardly, and the other walls between scavenging ports being tapered inwardly so that the planes of the opposite sides of each wall are substantially tangent to the aforesaid circle of about half the diameter of the bore, and the outer edges of all of the last mentioned walls being rounded to reduce resistance to scavenging air flow, said cylinder having exhaust ports provided in the wall thereof in circumferentially spaced relation in the remainder of the way around the circumference of the cylinder, the walls between said exhaust ports being in radial planes through the center of the cylinder and being tapered inwardly toward said center.

11. In an internal combustion engine, a cylinder having scavenging ports provided in the wall thereof in circumferentially spaced relation throughout at least half of the circumference, the ports on both sides of a median plane through the center having the walls therebetween in planes substantially tangent to a circle of a diameter about half the diameter of the bore of said cylinder, there being a wall in said median plane tapered inwardly symmetrically of said median plane, and the other walls between scavenging ports being tapered inwardly so that the planes of the opposite sides of each wall are substantially tangent to the aforesaid circle of about half the diameter of the bore, and the outer edges of all of the last mentioned walls being rounded to reduce resistance to scavenging air flow, said cylinder having exhaust ports provided in the wall thereof in circumferentially spaced relation in the remainder of the way around the circumference of the cylinder, the walls between said exhaust ports being in radial planes through the center of the cylinder and being tapered inwardly toward said center, said scavenging and exhaust ports being inclined toward one end of said cylinder at an angle of between 30° and 60° relative to the bore, and a piston operable in said bore, the aforesaid end of the cylinder and the top of the piston each having a marginal ring portion at substantially the same angle with respect to the bore as said ports.

12. In an internal combustion engine, a plurality of cylinders each having exhaust ports provided in the wall thereof in circumferentially spaced relation and elongated in form in the direction of piston movement, guide vanes in said exhaust ports in transverse relation thereto and substantially midway between the ends thereof, dividing the exhaust ports into primary and secondary channels for conducting exhaust gases from the cylinder, the inner ends of said guide vanes being rounded to reduce resistance to exhaust flow in the division of flow into the primary and secondary channels, an exhaust manifold to receive the exhaust gases from all of said cylinders, and means providing curved guiding walls in transverse relation to one another for conducting the exhaust gases from the aforesaid primary and secondary channels into the exhaust manifold, certain of said walls constituting continuations of the aforesaid guide vanes, the curvature of the other guiding walls being all in one general direction toward one end of the exhaust manifold.

13. In an internal combustion engine, a cylinder having scavenging ports and exhaust ports provided in the wall thereof in rows on diametrically opposite sides of the cylinder, the ports in each row being in circumferentially spaced relation and all directed toward one end of said cylinder at an angle of between 30° and 60° with respect to the bore, and a piston for said cylinder having a substantially conically tapered marginal ring portion, the base portion of which is at substantially the same angle as the ports, whereby the end walls of said ports form with the base portion of the ring portion on the piston nozzles with substantially parallel walls when ports are uncovered, the upper portion of said ring portion being at a smaller angle with respect to the bore so that scavenging air entering the scavenging ports is directed by the upper portion of the ring portion toward the end of the cylinder and away from the exhaust ports.

14. The herein described method of scavenging a two cycle internal combustion engine, which consists in introducing a plurality of jets of air near one end of the cylinder along intersecting lines from points on opposite sides of a median longitudinal plane through the cylinder throughout approximately two-thirds of the cylinder's circumference, each of the lines being substantially tangent to a circle inside the cylinder of approximately half the radius of the cylinder, whereby the jets of air on each side of the aforesaid plane are deflected by adjoining jets toward the cylinder walls, and the jets on opposite sides of said plane converge on said plane to form a more or less unified stream of scavenging air along the middle of one side of the cylinder, and causing a movement of said stream toward the opposite end of the cylinder and in a direction substantially parallel to the cylinder axis substantially without diminution of velocity.

15. The herein described method of scavenging a two cycle internal combustion engine, which consists in introducing a plurality of jets of air near one end of the cylinder along intersecting lines from points on opposite sides of a median longitudinal plane through the cylinder throughout approximately two-thirds of the cylinder's circumference, each of the lines being substantially tangent to a circle inside the cylinder of approximately half the radius of the cylinder, whereby the jets of air on each side of the aforesaid plane are deflected by adjoining jets toward the cylinder walls, and the jets on opposite sides of said plane converge on said plane to form a more or less unified stream of scavenging air along the middle of one side of the cylinder, and causing a movement of said stream toward the opposite end of the cylinder and in a direction substantially parallel to the cylinder axis substantially without diminution of velocity, the front formed by the scavenging air jets being of substantially arcuate form and equivalent to substantially half of the sectional area of the cylinder.

16. In an internal combustion engine, a cylinder having scavenging ports provided in the wall thereof in circumferentially spaced relation, the walls between ports being in planes substantially tangent to a circle of a diameter approximately half the diameter of the bore of said cylinder, all of said ports being directed toward one end of said cylinder at an angle of between 30° and 60° with respect to the bore and in a row extending about two-thirds of the way around the circumference of the cylinder, said cylinder having exhaust ports provided in the wall thereof in the remaining one-third of the way around the circumference of the cylinder, said ports all being directed away from the aforesaid end of the cylinder at an angle between 30° and 60° with respect to the bore, the ratio of port width to intervening wall width measured circumferentially of the cylinder bore being such that about two-thirds of the circumference is taken up by ports and about one-third is taken up by the intervening walls between ports.

17. In an internal combustion engine, a cylinder having scavenging ports provided in the wall thereof in circumferentially spaced relation, the walls between ports being in planes substantially tangent to a circle of a diameter approximately half the diameter of the bore of said cylinder, all of said ports being directed toward one end of said cylinder at an angle of between 30° and 60° with respect to the bore and in a row extending about two-thirds of the way around the circumference of the cylinder, said cylinder having exhaust ports provided in the wall thereof in the remaining one-third of the way around the circumference of the cylinder, said ports all being directed away from the aforesaid end of the cylinder at an angle between 30° and 60° with respect to the bore, the ratio of port width to intervening wall width measured circumferentially of the cylinder bore being such that about two-thirds of the circumference is taken up by ports and about one-third is taken up by the intervening walls between ports, and a piston for said cylinder having a conically tapered ring portion at substantially the same angle as the ports, whereby the end walls of said ports form with the ring portion on the piston nozzles with substantially parallel walls to control the direction of flow of scavenging air and exhaust gases.

18. An engine as set forth in claim 17, wherein the aforesaid end of the cylinder is cupola-shaped and has a conically tapered marginal ring portion at substantially the same angle as the tapered ring portion on said piston into which the tapered ring portion of said piston extends at one limit of its stroke.

19. In an internal combustion engine, a cylinder having scavenging ports provided in the wall thereof in circumferentially spaced relation throughout at least half of the circumference, the ports on both sides of a median plane through the center having the walls therebetween in planes substantially tangent to a circle of a diameter about half the diameter of the bore of said cylinder, there being a wall in said median plane tapered inwardly symmetrically of said median plane of the cylinder, and the other walls between scavenging ports being tapered inwardly so that the planes of the opposite sides of each wall are substantially tangent to the aforesaid circle of about half the diameter of the bore, and the outer edges of all of the last mentioned walls being rounded to reduce resistance to scavenging air flow, the ratio of port width to intervening wall width measured circumferentially of the cylinder bore being about two to one.

20. In an internal combustion engine, a cylinder having savenging ports provided in the wall thereof in circumferentially spaced relation throughout at least half of the circumference, the ports on both sides of a median plane through the center having the walls therebetween in planes substantially tangent to a circle of a diameter about half the diameter of the bore of said cylinder, there being a wall in said median plane tapered inwardly, and the other walls between scavenging ports being tapered inwardly so that the planes of the opposite sides of each wall are substantially tangent to the aforesaid circle of about half the diameter of the bore, and the outer edges of all of the last mentioned walls being rounded to reduce resistance to scavenging air flow, said cylinder having exhaust ports provided in the wall thereof in circumferentially spaced relation in the remainder of the way around the circumference of the cylinder, the walls between said exhaust ports being in radial planes through the center of the cylinder, and being tapered inwardly toward said center, the ratio of port width to intervening wall width measured circumferentially of the cylinder bore being such that about two-thirds of the circumference is taken up by ports and about one-third is taken up by the intervening walls between ports.

21. In an internal combustion engine, a cylinder having scavenging ports provided in the wall thereof in circumferentially spaced relation throughout at least half of the circumference, the ports on both sides of a median plane through the center having the walls therebetween in planes substantially tangent to a circle of a diameter about half the diameter of the bore of said cylinder, there being a wall in said median plane tapered inwardly symmetrically of said median plane, and the other walls between scavenging ports being tapered inwardly so that the planes of the opposite sides of each wall are substantially tangent to the aforesaid circle of about half the diameter of the bore, and the outer edges of all of the last mentioned walls being rounded to reduce resistance to scavenging air flow, said cylinder having exhaust ports provided in the wall thereof in circumferentially spaced relation in the remainder of the way around the circumference of the cylinder, the walls between said exhaust ports being in radial planes through the center of the cylinder and being tapered inwardly toward said center, said scavenging and exhaust ports being inclined toward one end of said cylinder at an angle of between 30° and 60° relative to the bore and a piston operable in said bore, the aforesaid end of the cylinder and the top of the piston each having a marginal ring portion at substantially the same angle with respect to the bore as said ports, the ratio of port width to intervening wall width measured circumferentially of the cylinder bore being such that about two-thirds of the circumference is taken up by ports and about one-third is taken up by the intervening walls between ports.

22. In an internal combustion engine, a cylinder having scavenging ports and exhaust ports provided in the wall thereof in rows on diametrically opposite sides of the cylinder, the ports in each row being in circumferentially spaced relation and all directed toward one end of said cylinder at an angle of between 30° and 60° with respect to the bore, and a piston for said cylinder having a substantially conically tapered marginal ring portion, the base portion of which is at substantially the same angle as the ports, whereby the end walls of said ports form with the base portion of the ring portion on the piston nozzles with substantially parallel walls when ports are uncovered, the upper portion of said ring portion being at a smaller angle with respect to the bore so that scavenging air entering the scavenging ports is directed by the upper portion of the ring portion toward the end of the cylinder and away from the exhaust ports, the ratio of port width to intervening wall width measured circumferentially of the cylinder bore being such that about two-thirds of the circumference is taken up by ports and about one-third is taken up by the intervening walls between ports.

HEINRICH SCHNEIDER.